US012289207B1

United States Patent
Chen et al.

(10) Patent No.: US 12,289,207 B1
(45) Date of Patent: Apr. 29, 2025

(54) PROFIT-AWARE OFFLOADING FRAMEWORK TOWARDS PREDICTION-ASSISTED MEC NETWORK SLICING

(71) Applicant: FUZHOU UNIVERSITY, Fuzhou (CN)

(72) Inventors: Zheyi Chen, Fuzhou (CN); Junjie Zhang, Fuzhou (CN); Jie Liang, Fuzhou (CN); Pengfei Wang, Fuzhou (CN)

(73) Assignee: FUZHOU UNIVERSITY, Fuzhou (CN)

( * ) Notice: Subject to any disclaimer, the term of this patent is extended or adjusted under 35 U.S.C. 154(b) by 11 days.

(21) Appl. No.: 18/399,693

(22) Filed: Dec. 29, 2023

Related U.S. Application Data

(63) Continuation of application No. PCT/CN2023/132499, filed on Nov. 20, 2023.

(51) Int. Cl.
*H04L 41/0826* (2022.01)
*H04L 41/0895* (2022.01)
*H04L 41/16* (2022.01)

(52) U.S. Cl.
CPC ...... *H04L 41/0826* (2013.01); *H04L 41/0895* (2022.05); *H04L 41/16* (2013.01)

(58) Field of Classification Search
CPC .. H04L 41/0826; H04L 41/0895; H04L 41/16
See application file for complete search history.

(56) References Cited

U.S. PATENT DOCUMENTS

2023/0035024 A1\* 2/2023 Rao .................. H04W 24/02
2023/0403568 A1\* 12/2023 Semiari .............. H04W 16/18

OTHER PUBLICATIONS

Chuanting Zhang, et al., Deep Transfer Learning for Intelligent Cellular Traffic Prediction Based on Cross-Domain Big Data, IEEE Journal on Selected Areas in Communications, 2019, pp. 1389-1401, vol. 37, No. 6.
Fuhui Zhou, et al., Computation Rate Maximization in UAV-Enabled Wireless Powered Mobile-Edge Computing Systems, IEEE Journal on Selected Areas in Communications, 2018.
(Continued)

*Primary Examiner* — Chris Parry
*Assistant Examiner* — Steven C Nguyen
(74) *Attorney, Agent, or Firm* — Bayramoglu Law Offices LLC

(57) ABSTRACT

A profit-aware Offloading Framework towards Prediction-assisted MEC Network Slicing is provided. Towards MEC network slicing, formulate the optimization problem of maximizing long-term ESP profits and decouple it into the sub-problems of Edge network Slicing (EnS) and Computation offloading Access (CoA). For the slicing sub-problem, use a gated recurrent neural network (GRNN) to accurately predict user requests in different regions, and then use the optimal partitioning of network slices with the predicted requests and expected demands; For the offloading sub-problem, incorporating results from slice partitioning, use an improved deep reinforcement learning with twin ritic-networks and delay mechanism, solving the Q-value overestimation and high variance for approximating the optimal offloading and resource allocation.

5 Claims, 6 Drawing Sheets

(56) References Cited

OTHER PUBLICATIONS

Yuyi Mao, et al., Dynamic Computation Offloading for Mobile-Edge Computing With Energy Harvesting Devices, IEEE Journal on Selected Areas in Communications, 2016, pp. 3590-3605, vol. 34, No. 12.

Samuel Burer, et al., Non-convex mixed-integer nonlinear programming: A survey, Surveys in Operations Research and Management Science, 2012, pp. 97-106, vol. 17.

Wen Wu, et al., AI-Native Network Slicing for 6G Networks, IEEE Wireless Communications, 2022, pp. 96-103.

Tanzina Afrin, et al., A Long Short-Term Memory-based correlated traffic data prediction framework, Knowledge-Based Systems, 2022, pp. 1-11, vol. 237, 107755.

Shutong Chen, et al., Optimal Admission Control Mechanism Design for Time-Sensitive Services in Edge Computing, IEEE Conference on Computer Communications (INFOCOM), 2022, pp. 1169-1178.

Samir Khuller, et al., The budgeted maximum coverage problem, Information Processing Letters, 1999, pp. 39-45, vol. 70.

Gianni Barlacchi, et al., A multi-source dataset of urban life in the city of Milan and the Province of Trentino, Scientific Data, 2015, pp. 1-15, 2:150055.

Xiangle Cheng, et al., Safeguard Network Slicing in 5G: A Learning Augmented Optimization Approach, IEEE Journal on Selected Areas in Communications, 2020.

Yao Chiang, et al., Deep Q-Learning-Based Dynamic Network Slicing and Task Offloading in Edge Network, IEEE Transactions on Network and Service Management, 2023, pp. 369-384, vol. 20, No. 1.

Federico Chiariotti, et al., Temporal Characterization and Prediction of VR Traffic: A Network Slicing Use Case, IEEE Transactions on Mobile Computing, 2023, pp. 1-18.

Yaping Cui, et al., QoS Guaranteed Network Slicing Orchestration for Internet of Vehicles, IEEE Internet of Things Journal, 2022, pp. 15215-15227, vol. 9, No. 16.

Sijing Duan, et al., MOTO: Mobility-Aware Online Task Offloading With Adaptive Load Balancing in Small-Cell MEC, IEEE Transactions on Mobile Computing, 2024, pp. 645-659, vol. 23, No. 1.

Jie Feng, et al., Dynamic Network Slicing and Resource Allocation in Mobile Edge Computing Systems, IEEE Transactions on Vehicular Technology, 2020, pp. 7863-7878, vol. 69, No. 7.

Sangwon Hwang, et al., Deep Reinforcement Learning Approach for UAV-Assisted Mobile Edge Computing Networks, IEEE Global Communications Conference: Selected Areas in Communications: Machine Learning for Communications, 2022, pp. 3839-3844.

Sladana Josilo, et al., Joint Wireless and Edge Computing Resource Management With Dynamic Network Slice Selection, IEEE/ACM Transactions on Networking, 2022, pp. 1865-1878, vol. 30, No. 4.

Arled Papa, et al., User-Based Quality of Service Aware Multi-Cell Radio Access Network Slicing, IEEE Transactions on Network and Service Management, 2022, pp. 756-768, vol. 19, No. 1.

Ju Ren, et al., An Efficient Two-Layer Task Offloading Scheme for MEC System with Multiple Services Providers, IEEE Conference on Computer Communications, 2022, pp. 1519-1528.

Hang Shen, et al., Slicing-Based Task Offloading in Space-Air-Ground Integrated Vehicular Networks, IEEE Transactions on Mobile Computing, 2023, pp. 1-15.

Xiong Wang, et al., Decentralized Task Offloading in Edge Computing: A Multi-User Multi-Armed Bandit Approach, IEEE Conference on Computer Communications, 2022, pp. 1199-1208.

Pengtao Zhao, et al., Information Prediction and Dynamic Programming based RAN Slicing for Mobile Edge Computing, IEEE Wireless Communications Letters, 2018, pp. 1-4.

* cited by examiner

PROFIT-AWARE OFFLOADING FRAMEWORK TOWARDS PREDICTION-ASSISTED MEC NETWORK SLICING

CROSS REFERENCE TO THE RELATED APPLICATIONS

This application is the continuation application of International Application No. PCT/CN2023/132499, filed on Nov. 20, 2023, the entire contents of which are incorporated herein by reference.

TECHNICAL FIELD

The present invention belongs to the technical field of Artificial Intelligence (AI) and Mobile Edge Computing (MEC), in particular relates to a Profit-aware Offloading Framework towards Prediction-assisted MEC Network Slicing.

BACKGROUND

With the rapid development of Artificial Intelligence (AI) and 5G communication technologies, a range of intelligent applications have been created and penetrated into every aspect of our society such as image recognition, semantic segmentation, and autonomous driving, exhibiting computation-intensive and latency-sensitive features. However, the limited computational capabilities of intelligent end devices seriously restrain their further development and popularity. To relieve this problem, Mobile Edge Computing (MEC), deploying resources at the network edge close to users, has been deemed as a promising solution. Compared to Cloud Computing, MEC significantly reduces data transmission latency and thus improves the Quality of Service (QoS).

For diverse applications, there are considerable differences in user service demands with respect to communication rate, response delay, and reliability. Traditional network architectures with fixed configurations struggle to meet such demand variability. To address this issue, the emerging network slicing, based on virtualization technologies including Network Function Virtualization (NFV) and Software Defined Networks (SDN), divides physical network resources into multiple logically-isolated slices bringing better network management and orchestration. Using the network slicing technique, a multi-tenant ecosystem is created in MEC environments. Thus, Edge Service Providers (ESPs) are able to deploy services to proper slices based on system states and user demands, offering customized configurations for network resources. Specifically, ESPs request slice resources from edge Infrastructure Providers (InPs) aligned with the demands of users' offloaded tasks to effectively alleviate the resource constraints of end devices. Empowered by partitioned slicing resources, ESPs can assist users in processing their offloaded tasks to enhance QoS. Despite being such a promising technology, most existing studies focus on slice partitioning in static environments, neglecting the spatio-temporal variability of user traffic and service demands in real-world scenarios. This oversight can lead to under-supply or over-supply situations that significantly degrade the QoS and profits of ESPs. Therefore, ESPs are required to dynamically orchestrate the slice resources to rapidly response to such variable user traffic and service demands.

Designing a reliable framework that effectively integrates network slicing and computation offloading is critically challenging. Existing studies on network slicing typically relied on predicting resources. However, the changeable number of users and unknown task attributes in real-world complex MEC environments make accurate prediction extremely difficult, and thus these studies struggle to achieve adequate adaptiveness. Moreover, the computation offloading access under dynamic MEC environments is also a challenging problem to be solved. To address this issue, existing studies of computation offloading access usually employed control theories or iterative algorithms. However, when the problem scale rises, the increasing computational complexity becomes unacceptable and causes excessive system overheads. Deep Reinforcement Learning (DRL), an emerging branch of Machine Learning (ML), has been preliminary applied to cope with the optimization problem of network slicing or computation offloading. Through interacting with unknown environments, the DRL demonstrates great potential for making appropriate decisions on dynamic and uncertain optimization problems, ultimately maximizing long term rewards. A few DRL-based studies attempted to address network slicing and computation offloading simultaneously, but they struggle to effectively address the issues of Q-value overestimation and high variance, causing unstable convergence or sub-optimum. Moreover, these studies fail to effectively integrate user traffic fluctuations with MEC network slicing.

RELATED WORK

Network Slicing. Cheng et al. proposed a two-stage network slicing model by predicting link traffic and correcting errors. Papa et al. designed a Lyapunov optimization based slicing approach to satisfy individual throughput while ensuring slice isolation. Zhao et al. developed a slicing algorithm based on information prediction and dynamic programming, aiming to maximize profits while realizing inter-slice isolation and intra-slice customization. Chiariotti et al. proposed a frame-size prediction model for virtual-reality applications to optimize network slicing strategies, ensuring QoS in multi-party interactions. Cui et al. designed a QoS-aware network slicing orchestration for Internet-of-Vehicles (IoV), guaranteeing stable QoS for vehicles. Most of these studies relied on prior user demands and static resource provisioning, but they neglect dynamic user locations and uncertain resource demands. Therefore, the existing studies commonly encounter huge prediction difficulties, leading to the under-supply or over-supply slice resources in real-world MEC environments.

Computation Offloading. Ren et al. proposed a two layer task offloading collaboration model, optimizing internal load balancing and external task offloading based on the game theory to maximize the revenue of ESPs. Wang et al. formulated the dynamic task offloading as a multi-armed bandit process and then designed a decentralized offloading method to optimize user rewards. Wu et al. developed an offloading access algorithm based on the Lyapunov optimization, balancing the energy and delay in MEC systems with dynamically-changing network conditions. Duan et al. proposed a deep Q-network based server grouping method for adaptive task offloading and load balancing in a scenario with unknown user movement. Hwang et al. designed an improved DRL-based approach for energy-efficient offloading in the UAV-assisted MEC network. However, these studies did not consider some important factors in real-world offloading scenarios such as the diversity of user request patterns and the dynamics of MEC resources.

Network Slicing with Computation Offloading. Josilo et al. proposed a network slicing method for low-latency offloading with game theory, jointly managing the radio and computing resources for slices. Feng et al. designed a network slicing framework for MEC systems, where the Liapunov optimization was used to make customized slicing to enhance the revenue of operators. These studies may perform well when facing static or stable scenarios, but it is hard for them to achieve the optimal network slicing and computation offloading in highly-dynamic MEC environments. Moreover, these studies required excessive iterations, causing huge computational overheads. Therefore, it is difficult for them to efficiently handle the large-scale problem of network slicing and computation offloading in complex MEC environments. Few studies utilized DRL to tackle the joint problem of network slicing and computation offloading. Shen et al. designed a slicing-enabled task offloading framework for space-air-ground vehicular networks by using a service-oriented slicing and Double DQN algorithm. Chiang et al. proposed a DQN-based network slicing framework to optimize slice scaling and task offloading, aiming to enhance QoS and the profits of service providers in edge systems. However, these studies evaluated state-action pairs by the maximized Q-value, leading to the overestimation, and the policy may fall into the sub-optimum or cannot achieve stable convergence due to the accumulated estimation errors and high variance.

REFERENCES

[1] C. Zhang, H. Zhang, J. Qiao, D. Yuan, and M. Zhang, "Deep transfer learning for intelligent cellular traffic prediction based on cross-domain big data," IEEE Journal on Selected Areas in Communications (JSAC), vol. 37, no. 6, pp. 1389-1401, 2019.
[2] F. Zhou, Y Wu, R. Q. Hu, and Y Qian, "Computation rate maximization in uav-enabled wireless-powered mobile-edge computing systems," IEEE Journal on Selected Areas in Communications (JSAC), vol. 36, no. 9, pp. 1927-1941, 2018.
[3] Y Mao, J. Zhang, and K. B. Letaief, "Dynamic computation offloading for mobile-edge computing with energy harvesting devices," IEEE Journal on Selected Areas in Communications (JSAC), vol. 34, no. 12, pp. 3590-3605, 2016.
[4] S. Burer and A. N. Letchford, "Non-convex mixed-integer nonlinear programming: A survey," Surveys in Operations Research and Management Science, vol. 17, no. 2, pp. 97-106, 2012.
[5] W. Wu, C. Zhou, M. Li, H. Wu, H. Zhou, N. Zhang, X. S. Shen, and W. Zhuang, "Ai-native network slicing for 6g networks," IEEE Wireless Communications, vol. 29, no. 1, pp. 96-103, 2022.
[6] T. Afrin and N. Yodo, "A long short-term memory-based correlated traffic data prediction framework," Knowledge-Based Systems (KBS), vol. 237, p. 107755, 2022.
[7] S. Chen, L. Wang, and F. Liu, "Optimal admission control mechanism design for time-sensitive services in edge computing," in IEEE Conference on Computer Communications (INFOCOM), pp. 1169-1178, IEEE, 2022.
[8] S. Khuller, A. Moss, and J. S. Naor, "The budgeted maximum coverage problem," Information Processing Letters, vol. 70, no. 1, pp. 39-45, 1999.
[9] G. Barlacchi, M. De Nadai, R. Larcher, A. Casella, C. Chitic, G. Torrisi, F. Antonelli, A. Vespignani, A. Pentland, and B. Lepri, "A multi-source dataset of urban life in the city of milan and the province of trentino," Scientific Data, vol. 2, no. 1, pp. 1-15, 2015.

SUMMARY

The purpose of the present invention is to provide a Profit-aware Offloading Framework towards Prediction-assisted MEC Network Slicing.

Considering in Mobile Edge Computing (MEC), emerging network slicing and computation offloading enable Edge Service Providers (ESPs) to respond to diverse spatio-temporal distributions of user requests, with the aim of improving Quality-of-Service (QoS) and resource efficiency. However, dynamic system states and various request patterns seriously hinder their broader implementation in MEC systems. Existing solutions commonly rely on static resource slicing or prior system knowledge, lacking adaptability and thus causing unsatisfying QoS and resource provisioning.

To address these important challenges, we propose SliceOff, a novel profit-aware offloading framework towards prediction-assisted MEC network slicing. For the slicing sub-problem, we design a gated recurrent neural network to accurately predict user requests in different regions, and then theoretically derive the optimal partitioning of network slices with the predicted requests and expected demands. For the offloading sub-problem, incorporating results from slice partitioning, we develop an improved deep reinforcement learning with twin critic-networks and delay mechanism, solving the Q-value overestimation and high variance for approximating the optimal offloading and resource allocation. Using real-world testbed and datasets of user traffic, extensive experiments are conducted to validate the effectiveness of the proposed SliceOff. Compared to benchmark methods, the SliceOff enhances ESP profits and exhibits superior performance in different scenarios.

To realize the above purpose, the technical solution of the present invention is as follows:

A Profit-aware Offloading Framework towards Prediction-assisted MEC Network Slicing:

Towards MEC network slicing, formulating the optimization problem of maximizing long-term ESP profits and decouple it into the sub-problems of Edge network Slicing (EnS) and Computation offloading Access (CoA); For the slicing sub-problem, use a gated recurrent neural network (RNN) to accurately predict user requests in different regions, and then use the optimal partitioning of network slices with the predicted requests and expected demands; For the offloading sub-problem, incorporating results from slice partitioning, use an improved deep reinforcement learning with twin critic-networks and delay mechanism, solving the Q-value overestimation and high variance for approximating the optimal offloading and resource allocation.

Furthermore, wherein formulate the optimization problem of maximizing long-term ESP profits and decouple it into the sub-problems of Edge network Slicing (EnS) and Computation offloading Access (CoA) is as follows:

When assessing the profits of the ESP, it is essential to take into consideration both the revenues and costs of processing tasks; On the one hand, the ESP receives revenues from users according to the provided services; If a user task can be completed within its maximum tolerable delay $T^{max}$, the ESP will receive revenue $\Phi$; Otherwise, there is no revenue; The revenue received from u, within t defined as $$v_i^t = \begin{cases} \Phi, & \text{if } T_i^{total} \leq T^{max} \\ 0, & \text{otherwise} \end{cases},$$

After completing tasks with different priorities, the ESP receives various revenues. The revenues within h are defined as $$R^h = \sum_{t=1}^{T} \sum_{i=1}^{n} v_i^t \rho_i$$

On the other hand, the ESP needs to pay for the rented resources; The costs of renting resources within h are defined as $$C^h = \zeta_b B_{esp}^h + \zeta_f F_{esp}^b$$

where $B_{esp}^h$ and $F_{exp}^h$ are bandwidth and computing resources rented by the ESP, respectively; $\zeta_b$ and $\zeta_f$ are the unit price of bandwidth and computing resources, respectively;

Considering our goal is to maximize the long-term ESP profits, and thus the optimization problem is defined as $$\max_{B,F,x,b} \sum_{h=1}^{H} (R^h - C^h) \quad \text{P1}$$

$$\text{s.t. } C1: B_{esp}^h \in [0, B_{max}], \forall h,$$

$$C2: F_{esp}^h \in [0, F_{max}], \forall h,$$

$$C3: x_i^t \in \{0, 1\}, \forall i, \forall t,$$

$$C4: \sum_{i=1}^{n} b_i^t \leq B_{esp}^h, \forall t,$$

$$C5: \sum_{i=1}^{n} f^{edge} \leq F_{esp}^h, \forall t$$

where C1 and C2 represent that the bandwidth and computing resources allocated to the ESP cannot exceed total system resources. C3 represents that the offloading request can only be accepted or rejected by the ESP; C4 and C5 represent that the bandwidth and computing resources allocated to users cannot exceed the available resources of the ESP;

Because the allocation of bandwidth and computing resources is a continuous decision-making process and the offloading decision is an integer variable, P1 is a mixed integer nonlinear programming (MINLP) problem; To effectively relieve this issue, we decouple P1 into the sub-problems of Edge network slicing (EnS) and Computation offloading Access (CoA) as follows:

P1.1 (EnS): Maximize ESP profits in long time slots by partitioning network slices; This sub-problem is defined as:

$$\max_{B,F} \sum_{h=1}^{H} (R^h - C^{th})$$

$$\text{s.t. } C1 - C2$$

P1.2 (CoA): Maximize the ESP revenues in short time slots by conducting computation offloading and resource allocation; This sub-problem is defined as $$\max_{x,b} \sum_{i=1}^{n} v_i^t \rho_i$$

$$\text{s.t. } C3 - C5$$

Furthermore, wherein use a gated recurrent neural network (GRNN) to accurately predict user requests in different regions, and then use the optimal partitioning of network slices with the predicted requests and expected demands is as follows:

As different regions have varying bandwidth demands, based on the predicted user request traffic, adopt the historical average value (HAV) to calculate the expected resource demands, and use Long Short-Term Memory (LSTM) to predict user request traffic in these regions; Finally, theoretically derive the optimal slice partitioning through combining the predicted user request traffic and expected resource demands.

Furthermore, execute Algorithm 2: After inputting the historical request traffic Z, initialize the learning rate $\gamma$, input length $L_c$, and prediction length $L_p$, where $L_p \geq T$; For each prediction window, inputs the historical user traffic Z' into the LSTM cell to predict the traffic for future $L_p$ time slots; Specifically, the LSTM cell controls the information flow into neural networks through the forget, input, and output gates;

First, Z' is used to update the forget gate f, and the input gate $i_\tau$, where $f_\tau$ determines the information that was forgotten at the previous moment and i, determines the new information that will be stored in the current cell state; Then, the cell candidate state $\tilde{C}_\tau$ is defined as $$\tilde{C}_\tau = \tanh(W_c[Z^\tau, H_{\tau-1}] + b_c)$$

Next, cell state $C_\tau$ and the output gate $\tilde{z}^\tau$ are updated, and then the output of the hidden layer $H_\tau$ is updated; After analyzing all the data in historical windows, the prediction of user traffic for m regions in $L_p$ short time slots can be obtained, denoted by $$\tilde{Z} = [z^1, z^2, \ldots, z^{L_n}],$$

where $$z^t = [z_1^T, z_2^T, \ldots, z_m^T];$$

For each historical short time slot t, the HAV is used to calculate the expected bandwidth E[$b_j$] and user priority E[$\tau_j$] for the completed tasks, and to calculate the bandwidth demand $B_{need}^t$, computing demand $F_{need}^t$, and expected revenue $R^t$ for the ESP based on $\tilde{z}_j^t$, E[$b_j$], E[$\rho_j$], and $f^{edge}$; Finally, the optimal $B_{esp}^h$ and $F_{esp}^h$ are derived by Lemma 1 and used for slice partitioning;

Lemma 1. ESP profits can be maximized when $B_{esp}^h p = \max(B_{need}^t)$ and $F_{esp}^h = \max(F_{need}^t)$.

Furthermore, where in for the offloading sub-problem, incorporating results from slice partitioning, use an improved deep reinforcement learning with twin critic-networks and delay mechanism, solving the Q-value overestimation and high variance for approximating the optimal offloading and resource allocation is as follows:

ESP profits while meeting QoS, regard the problem model of P1.2 as the environment, the DRL agent optimizes policies through continuously interacting with the environment, which can be formulated as a Markov decision process; Specifically, the state space, action space, and reward function are defined as follows:

State Space: The state space contains the available resources of the ESP and task attributes in the current time slot; To better capture demand features, convert the data size and computing density of tasks into the demands for uploading rate and computational frequency; Thus, the system state at t is defined as $$s_t = \left\{ B_{exp}^h, F_{exp}^h, \frac{c^t l^t}{T^{max}}, \frac{c^t \eta^t}{T^{max}}, \rho^t \right\}$$

Action Space: design a probability distribution function for the discrete action space of offloading access; Specifically, the action space at t indicates the bandwidth allocation for each user, and it is defined as $$a_t = b^t,$$

where $b^t = \{b_1^t, b_2^t, \ldots, b_m^t\}$. Next, the action of offloading access is defined as $$x_i^t = \begin{cases} 1, & \text{if } b_i^t > 0, \\ 0, & \text{otherwise} \end{cases}$$

If the allocated bandwidth is positive, a request for offloading access will be accepted along with the corresponding bandwidth allocation; Otherwise, the request will be rejected and the task will be executed locally;

Reward Function: The optimization objective of P1.2 is to maximize the cumulative ESP revenues from users; Therefore, the reward function indicates ESP revenues, and it is defined as $$r_t = \sum_{i=1}^{n} v_i^t \rho_i$$

Based on the above definitions, execute Algorithm 3: First, we initialize the online networks including two critic-networks $Q_1$ and $Q_2$ and the actor-network µ, and two target critic-networks $Q_1'$ and $Q_2'$ and the target actor-network µ'; For each training epoch, the environment is first initialized;

At each short time slot t, the users send their requests of computation offloading access to the ESP; For these requests, the state $s_t$ is fed into the actor-network µ, and then the DRL agent explores the action of resource allocation $a_t$ in the current state according to p and exploration noise; Next, the actions of bandwidth allocation $b^t$ and computation offloading access $x^t$ are obtained according to Eqs=$a_t$=$b^t$ and $$s_t = \left\{ B_{esp}^h, F_{esp}^h, \frac{c^t l^t}{T^{max}}, \frac{c^t \eta^t}{T^{max}}, \rho^t \right\}$$

After completing bandwidth allocation and computation offloading, the environment provides feedback in the form of immediate reward and the next state; Next, the samples of state transition are stored in the replay buffer, where K training samples are randomly selected for updating network parameters; When updating the critic-network, the action $\tilde{a}_{t+1}$ at $s_{t+1}$ is first obtained by the target actor-network; This process can be described as $$a_{t+1} = \mu'(s_{t+1}|\theta^{\mu'}) + \varepsilon, \varepsilon \sim N(0,\sigma)$$

where the network noise ε is a regularization that makes similar actions own comparable rewards;

Then, the target Q-value is obtained by using the reward and comparing two critic-networks; This process can be described as $$y_t = r(s_t, a_t) + \gamma \cdot \min_{i=1,2} \left( Q_{\theta_i'}'(s_{t+1}, \tilde{a}_{t+1}) \right)$$

Next, the two critic-networks are updated; To reduce the updating frequency of low-quality policies, we design a delay mechanism to update the actor-network and target networks; If t mod 2=0, the actor-network is updated using gradient ascent, and the target networks are updated using soft updates.

Furthermore, for each long time slot, first invokes Algorithm 2 to predict the demands of bandwidth and computing resources for task execution (i.e., $B_{esp}^h$ and $F_{esp}^h$), and then performs network slicing and calculate resource costs based on the partitioned slice resources; For each short time slot, after users send requests of computation offloading access to the ESP, invokes Algorithm 3 to generate offloading access and bandwidth allocation decisions (i.e., $x^t$ and $b^t$) based on the current system state and user demands; Next, users' tasks are processed according to offloading decisions and the ESP receives revenues; Then, calculates ESP profits based on the costs and revenues; Finally, goes to the next long time slot.

Compared with the prior art, the present invention has the following beneficial effects:
1. We propose a new two-timescale based computation offloading access model towards MEC network slicing. Specifically, we formulate the optimization problem of maximizing long-term ESP profits and decouple it into the sub-problems of Edge network Slicing (EnS) and Computation offloading Access (CoA).
2. For EnS, we design a novel prediction-assisted slice partitioning method. First, we adopt a gated recurrent neural network to accurately predict future user requests in different regions. Next, we calculate expected demands via the historical average value (HAV). Finally, we theoretically derive the optimal partitioning of network slices based on user requests and expected demands.
3. For CoA, we develop an improved DRL-based offloading method. First, we prove that the CoA is NP-hard. Next, we design a dedicated Markov model for the action space of CoA. Finally, incorporating results from slice partitioning in EnS, twin critic-networks and a delay mechanism are designed in the improved DRL to address the Q-value overestimation and high variance, enabling near-optimal offloading and resource allocation.
4. Using real-world testbed and datasets of user traffic, extensive experiments are conducted to verify the effectiveness of the proposed SliceOff. Compared to benchmark methods, the SliceOff improves ESP profits while achieving higher resource utilization and lower delay violation. Further, testbed experiments validate the superiority of the SliceOff, which mitigates the unbalanced performance caused by diverse spatio-temporal distributions of user requests and reduces task execution time.

DETAILED DESCRIPTION OF THE EMBODIMENTS

Figure 1:
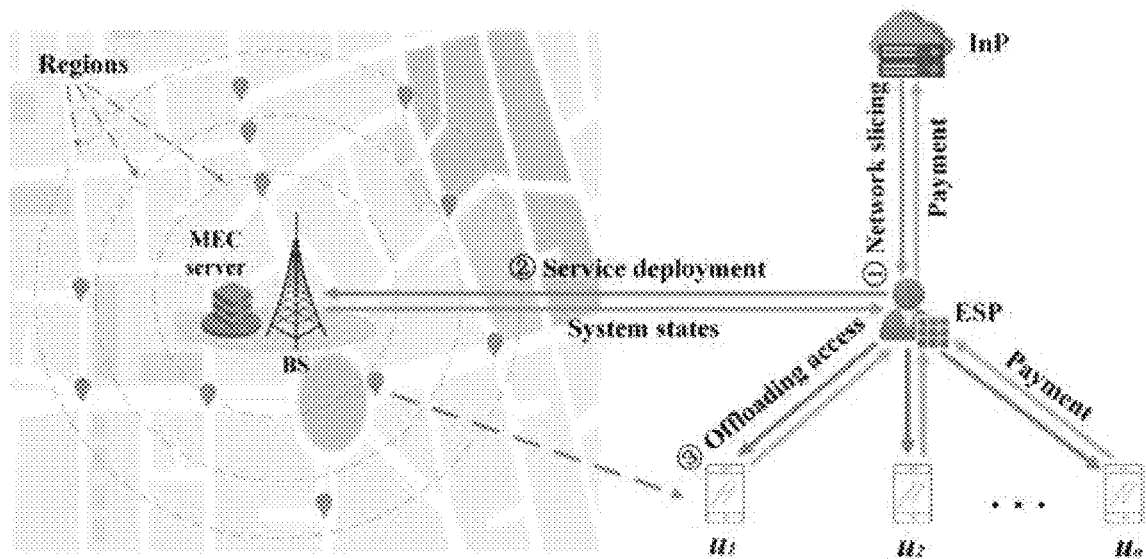
FIG. 1 is a computation offloading access system towards MEC network slicing.

The technical solution of the present invention is described in detail in combination with the accompany drawings.
System Model and Problem Formulation
FIG. 1 illustrates the proposed computation offloading access system towards MEC network slicing. In this system, the Base Station (BS) and MEC server offer network and computing resources for processing the offloaded tasks from the intelligent applications of users. Users are randomly distributed within the communication coverage of the BS, which is divided into several regions based on the distance to the BS. The ESP first sends slicing requests with demanded resources to the InP and makes payment. Next, the ESP deploys the offloading service on the MEC server and manages the owned resources and system states. Finally, by paying fees, users can access the offloading service for processing their tasks.
The total bandwidth of the BS and the total computational capability of the MEC server are denoted as $B_{max}$ and $F_{max}$, respectively. Users within the coverage of BS are denoted as the set $U=\{u_1, u_2, \ldots, u_n\}$, and regions are denoted as the set $Reg=\{reg_1, reg_2, \ldots, reg_m\}$. Due to user mobility, the number of user requests in different regions and time slots experiences fluctuations, leading to an uneven spatio-temporal distribution of service demands [1]. To avoid frequent slice adjustment and simulate real-world scenarios, we adopt two scales of time slots to cope with the problems with different dimensions. Specifically, a long time slot is denoted as $h \in \{1, 2, \ldots, H\}$. At the beginning of h, the ESP evaluates the required resources in the current system and sends a request for network slicing to the InP. h is divided into several short time slots, denoted as $t \in \{1, 2, \ldots, T\}$. At the beginning of t, users send requests for computation offloading access to the ESP. The ESP evaluates the resource demands and priorities of users and then makes proper policies for computation offloading access and resource allocation.
Computation Model
A task from $u_i$ is defined as a 5-tuple $\langle d_i, \eta_i, \rho_i, reg_i, l_i \rangle$, where $d_i$ is the data size, $\eta_i$ is the computing density, $\rho_i$ is the priority of $u_i$, $reg_i$ is the region where $u_i$ stays, and $l_i$ is the distance from $u_i$ to the BS. When $u_i$ sends an offloading request, the ESP will decide whether to accept the request.
Local Mode. When the request is rejected, $u_i$ executes the task locally, and the task execution time is defined as $$T_i^{loc} = \frac{d_i \eta_i}{f^{loc}}, \qquad (1)$$

where $f^{loc}$ is the computational capability of $u_i$.
Edge Mode. When the request is accepted, $u_i$ offloads the task to the MEC server for execution, and the input data should also be uploaded. When the ESP allocates the bandwidth $b_i^t$ to $u_i$, according to Shannon's formula [2], the upload rate is defined as $$r_i^t = b_i^t \log_2\left(1 - \frac{pg_i}{\sigma^2}\right). \qquad (2)$$

where p is the upload power, $\sigma^2$ is the noise power, $g_i = \beta_0 l_i^{-\theta}$ is the channel power gain between $u_i$ and the BS.
Compared to the input data, the output data is typically small and negligible [3]. Therefore, the task execution time in the edge mode is defined as $$T_i^{edge} = \frac{d_i}{r_i^t} + \frac{d_i \eta_i}{f^{edge}}. \qquad (3)$$

where $f^{edge}$ indicates the computational capability allocated by the MEC server.
By considering the above two modes, the task execution time can be described as $$T_i^{total} = (1 - x_i^t) T_i^{loc} + x_i^t T_i^{edge}, \qquad (4)$$

where $x_i^t \in \{0, 1\}$ is the offloading access decision of $u_i$ at t.
B. Profit Model
When assessing the profits of the ESP, it is essential to take into consideration both the revenues and costs of processing tasks. On the one hand, the ESP receives revenues from users
according to the provided services. If a user task can be completed within its maximum tolerable delay $T^{max}$, the ESP will receive revenue (D. Otherwise, there is no revenue. The revenue received from $u_i$ within t defined as $$v_i^t = \begin{cases} \Phi, & \text{if } T_i^{total} \leq T^{max} \\ 0, & \text{otherwise.} \end{cases} \quad (5)$$

After completing tasks with different priorities, the ESP receives various revenues. The revenues within h are defined as $$R^h = \sum_{t=1}^{T}\sum_{i=1}^{n} v_i^t \rho_i. \quad (6)$$

On the other hand, the ESP needs to pay for the rented resources. The costs of renting resources within h are defined as $$C^h = \zeta_b B_{esp}^h + \zeta_f F_{esp}^h. \quad (7)$$

where $B_{esp}^h$, and $F_{esp}^h$ are bandwidth and computing resources rented by the ESP, respectively; $\zeta_b$ and $\zeta_f$ are the unit price of bandwidth and computing resources, respectively.

C. Problem Formulation

Our goal is to maximize the long-term ESP profits, and thus the optimization problem is defined as $$P1: \max_{B,F,x,b} \sum_{h=1}^{H}(R^h - C^h) \quad (8)$$

s.t. $C1: B_{esp}^h \in [0, B_{max}], \forall h,$ $C2: F_{esp}^h \in [0, F_{max}]. \forall h,$ $C3: x_i^t \in \{0, 1\}, \forall i, \forall t,$ $C4: \sum_{i=1}^{n} b_i^t \leq B_{esp}^h, \forall t,$ $C5: \sum_{i=1}^{n} f^{edge} \leq F_{esp}^h, \forall t.$ where C1 and C2 represent that the bandwidth and computing resources allocated to the ESP cannot exceed total system resources. C3 represents that the offloading request can only
be accepted or rejected by the ESP; C4 and C5 represent that the bandwidth and computing resources allocated to users cannot exceed the available resources of the ESP;

Because the allocation of bandwidth and computing resources is a continuous decision-making process and the offloading decision is an integer variable, P1 is a mixed integer nonlinear programming (MINLP) problem[4]; To effectively relieve this issue, we decouple P1 into the sub-problems of Edge network slicing (EnS) and Computation offloading Access (CoA) as follows:

P1.1 (EnS): Maximize ESP profits in long time slots by partitioning network slices; This sub-problem is defined as:

$$\max_{B,F} \sum_{h=1}^{H}(R^h - C^h) \quad (9)$$

s.t. $C1 - C2.$

P1.2 (CoA): Maximize the ESP revenues in short time slots by conducting computation offloading and resource allocation; This sub-problem is defined as $$\max_{x,b} \sum_{i=1}^{n} v_i^t \rho_i \quad (10)$$

s.t. $C3 - C5.$

The Proposed SliceOff

A. Overview of the SliceOff

We propose SliceOff, a novel profit-aware offloading framework towards prediction-assisted MEC network slicing, with the aim of maximizing ESP profits by addressing the sub problems P1.1 and P1.2. For P1.1, the SliceOff first conducts
 in-depth analysis and accurate prediction of user traffic and resource demands, and then theoretically derives the optimal slice partitioning for long time slots. For P1.2, the SliceOff
 generates proper policies of computation offloading access and resource allocation for short time slots.

The main workflow of the SliceOff is outlined in Algorithm 1. For each long time slot, the SliceOff first invokes Algorithm 2 to predict the demands of bandwidth and computing resources for task execution (i.e., $B_{esp}^h$ and $F_{esp}^h$), and then performs network slicing and calculate resource costs based on the partitioned slice. For each short time slot, after users send requests of computation offloading access to the ESP, the SliceOffinvokes Algorithm 3 to generate offloading access and bandwidth allocation decisions (i.e., $x^t$ and $b^t$) based on the current system state and user demands. Next, users' tasks are processed according to offloading decisions and the ESP receives revenues; Then, calculates ESP profits based on the costs and revenues. Finally, the SliceOff goes to the next long time slot.

---

ALGORITHM 1

The proposed SliceOf

---

Input: $B_{max}$, $F_{max}$, $\zeta_b$, $\zeta_f$, H, T
Output: ESP profits
for h = 1, 2, ..., H do
  |Invoke Algorithm 2 to predict $B_{esp}^h$ and $F_{esp}^h$;
  |Perform network slicing and calculate
  |resource costs based on $B_{esp}^h$ and $F_{esp}^h$;
  |for t = 1, 2, ..., T do
  |    |Users send offloading requests to the ESP;
  |    |Invoke Algorithm 3 to generate $x^t$ and $b^t$;
  |    |Process tasks and calculate ESP revenues;
  |end
  |Calculate ESP profits based on costs and revenues;
end

---

B. Prediction-Assisted Slice Partitioning

Commonly, the performance of slice resource allocation can be greatly improved by analyzing features of user requests and predicting future resource demands [5]. In light of this
 idea, we will solve P1.1 by conducting slice partitioning based on the prediction of future resource demands. As different regions have varying bandwidth demands, we first analyze the
 historical data and use Long Short-Term Memory (LSTM), an improved Recurrent Neural Network (RNN), to predict user request traffic in these regions. LSTM extracts temporal correlations in sequences, solving gradient vanishing and has proven useful for traffic prediction [6]. However, resource demands cannot be directly obtained from tasks in real-world scenarios due to their uncertain attributes. To address this problem, based on the predicted user request traffic, we further adopt the historical average value (HAV) to calculate the expected resource demands. Finally, we theoretically derive the optimal slice partitioning through combining the predicted user request traffic and expected resource demands. The key steps of the proposed prediction-assisted slice partitioning method are outlined in

---

Algorithm 2.
Algorithm 2: Prediction-assisted slice partitioning

---

Input: Z
Output: $B_{esp}^h$, $F_{esp}^h$
Initialize $\gamma$, $L_c$, $L_p$
for $\tau = 1, 2, \ldots, L_p$ do

| Obtain $Z^\tau = [z^{\tau-L_c}, z^{\tau-L_c+1}, \ldots, z^{\tau-1}]$, where $z^{\tau-L_c} = [z_1^{\tau-L_c}, z_2^{\tau-L_c}, \ldots, z_m^{\tau-1}]$

| Update $f_\tau = sig(W_f[Z^\tau, H_{\tau-1}] + b_f)$ and $i_\tau = sig(W_i[Z^\tau, H_{\tau-1}] + b_i)$;

| Update $C_\tau = f_\tau C_{\tau-1} + i_\tau \tilde{C}_\tau$ and $\tilde{z}^\tau = sig(W_o[Z^\tau, H_{\tau-1}] + b_o)$;

| Output $H_\tau = \tilde{z}\prime \tanh(C_\tau)$;
end
for $t = 1, 2, \ldots, T$ do

| Calculate $E[b_j]$ and $E[\rho_j]$ with $HAV$;

| Calculate $B_{need}^t = \sum_{j=1}^{m} \tilde{z}_j^t E[b_j]$, $F_{need}^t = \sum_{j=1}^{m} \tilde{z}_j^t f^{edge}$ and $R^t = \sum_{j=1}^{m} \tilde{z}_j^t E[\rho_j] \Phi$;

end

Derive the optimal $B_{esp}^h = \max(B_{need}^t)$ and $F_{esp}^h = \max(F_{need}^t)$ for slice partitioning.

---

After inputting the historical request traffic Z, initialize the learning rate $\gamma$, input length $L_c$, and prediction length $L_p$, where $L_p \geq T$; For each prediction window, inputs the historical user traffic $Z^\tau$ into the LSTM cell to predict the traffic for future $L_p$ time slots. Specifically, the LSTM cell controls the information flow into neural networks through the forget, input, and output gates;

First, $Z^\tau$ is used to update the forget gate $f_\tau$ and the input gate $i_\tau$, where $f_\tau$ determines the information that was forgotten at the previous moment and $i_\tau$ determines the new information that will be stored in the current cell state. Then, the cell candidate state $\tilde{C}_\tau$ is defined as $$\tilde{C}_\tau = \tanh(W_c[Z^\tau, H_{\tau-1}] + b_c). \quad (11)$$

Next, cell state $C_\tau$ and the output gate $\tilde{z}^\tau$ are updated, and then the output of the hidden layer $H_\tau$. After analyzing all the data in historical windows, the prediction of user traffic for m regions in L, short time slots can be obtained, denoted by $$\tilde{Z} = [\tilde{z}^1, \tilde{z}^2, \ldots, \tilde{z}^{L_p}],$$

where $$\tilde{z}^\tau = [z_1^\tau, z_2^\tau, \ldots, z_m^\tau];$$

For each historical short time slot t, the HAV is used to calculate the expected bandwidth $E[b_j]$ and user priority $E[\rho_j]$ for the completed tasks, and to calculate the bandwidth demand $B_{need}^t$, computing demand $F_{need}^t$, and expected revenue $R^t$ for the ESP based on $$\tilde{Z}_j^t, E[b_j], E[\rho_j],$$

and $f_{edge}$; Finally, the optimal $B_{esp}^h$ and $F_{esp}^h$ are derived by Lemma 1 and used for slice partitioning;

Lemma 1. ESP profits can be maximized when $B_{esp}^h = \max(B_{need}^t)$ and $F_{esp}^h = \max(F_{need}^t)$.

Proof 1. For clarity, $B_{ehs}^h$ and $B_{need}^t$ are replaced by B and $B^t$, respectively. Due to common rationality [7], the revenue obtained by ESP for providing offloading services should be more than the cost of resources, thus $\forall t, R^t > B^t \zeta_b$, always holds. According to Eq. (5), the ESP can obtain revenue only when the resources allocated to the task enable it to be completed within the maximum tolerable delay. Therefore, the revenues that the ESP obtains within a short time slot are equal to the ratio between total revenues and resource demands.

Let $B^1 \leq B^2 \leq \ldots \leq B^T$, the ESP profits within long time slots are defined as $$U = R^1 \min\left(\frac{B}{B^1}, 1\right) + \ldots + R^T \min\left(\frac{B}{B^T}, 1\right) - B\zeta_b. \tag{12}$$

When $$B \in [0, B^1], U_1 = B\left(\sum_{t=1}^T \frac{R^t}{B^t} - \zeta_b\right), \text{ for } B = B^1.$$

$$U_1^* = R^1 + B^1\left(\sum_{t=2}^T \frac{R^t}{B^t} - \zeta_b\right). \tag{13}$$

When $$B \in [B^1, B^2], \text{ for } B = B^2,$$

$$U_2^* = R^1 + R^2 + B^2\left(\sum_{t=3}^T \frac{R^t}{B^t} - \zeta_b\right) \tag{14}$$

Let $$U_2^* - U_1^*, \Delta = (B^2 - B^1)\left(\sum_{t=2}^T \frac{R^t}{B^t} - \zeta_b\right). \tag{15}$$

Because $$\frac{R^t}{B^t} > \zeta_b,$$

thus $$\sum_{t=2}^T \frac{R^t}{B^t} - \zeta_b > 0, U_2^* \geq U_1^*.$$

Similarly, when $B \in [B^{T-1}, B^T]$, for $B = B^T$, $$U_T^* \sum_{t=1}^T \frac{R^t}{B^t} - B^T \zeta_b. \tag{16}$$

We can derive that $U_T^* \geq U_{T-1}^* \geq \ldots \geq U_T^*$. Thus, when $B = B^T$ (i.e., $B_{esp}^h = \max(B_{need}^t)$), ESP profits can be maximized. Similarly, when $F_{esp}^h = \max(F_{need}^t)$, ESP profits can be maximized. In summary, Lemma 1 is proved.

C. Improved DRL for Computation Offloading Access and Resource Allocation

P1.2 can be transferred into a classic budgeted maximum coverage problem (BMCP) that has been proven to be NP-hard [8]. The BMCP considers a set $E = \{e_1, e_1, \ldots, e_n\}$, where elements are with costs and values. The objective of solving the BMCP is to select a subset $E' \subseteq E$, so that the total values are maximized without exceeding the cost budget. For P1.2, offloading requests can be regarded as elements in E, costs can be regarded as allocated resources, and values of elements can be regarded as revenues obtained from completing tasks. Therefore, we aim to seek the set $U' \subseteq U$ that can maximize the total revenue $R^h$ without exceeding the costs $B_{esp}^h$ and $F_{esp}^h$. Based on the above analysis and derivation, we prove that P1.2 is an NP-hard problem.

Figure 2:
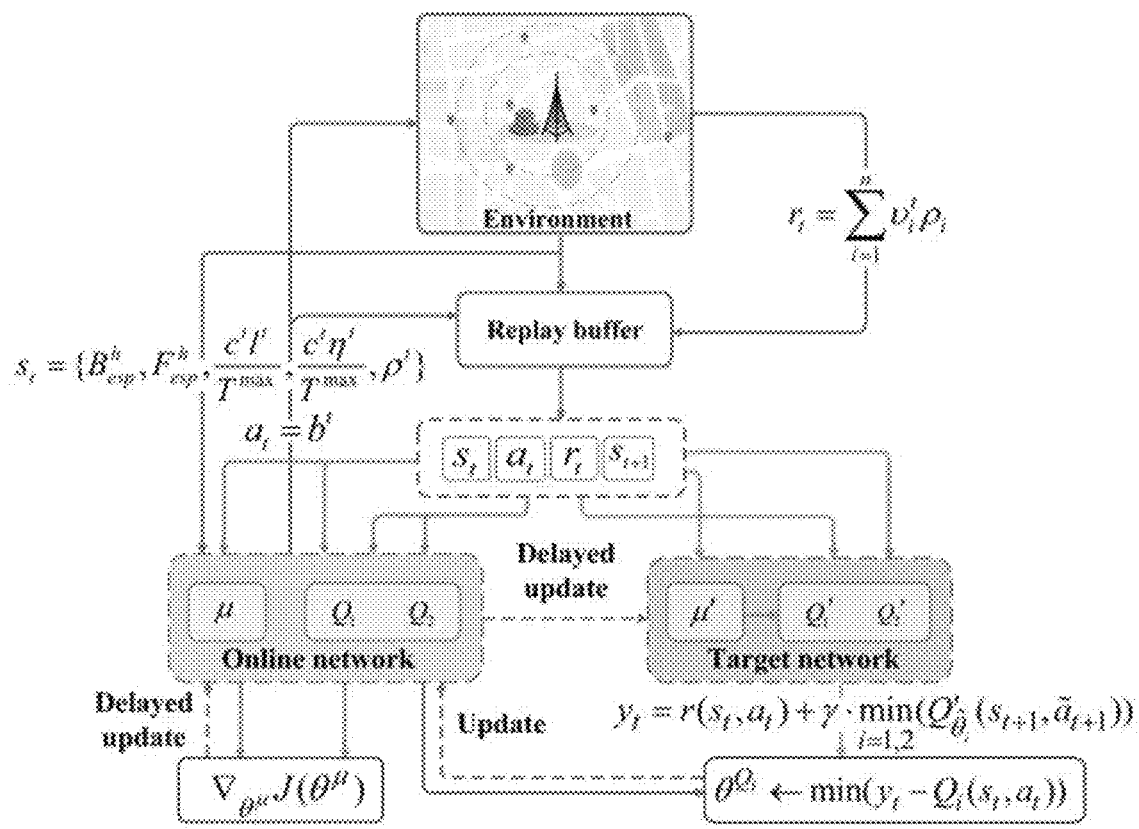
FIG. 2 is an improved DRL for offloading access and resource allocation.

To address this problem, we propose an improved DRL that can adaptively make the optimal policy of computation offloading access and resource allocation, aiming to maximize ESP profits while meeting QoS. As shown in FIG. 2, we regard the problem model of P1.2 as the environment, the DRL agent optimizes policies through continuously interacting with the environment, which can be formulated as a Markov decision process. Specifically, the state space, action space, and reward function are defined as follows.

State Space. The state space contains the available resources of the ESP and task attributes in the current time slot. To better capture demand features, we convert the data size and computing density of tasks into the demands for uploading rate and computational frequency. Thus, the system state at t is defined as $$s_t = \left\{B_{esp}^h, F_{esp}^h, \frac{c^t l^t}{T^{max}}; \frac{c^t \eta^t}{T^{max}}, \rho^t\right\}. \tag{17}$$

Action Space. We design a probability distribution function for the discrete action space of offloading access. Specifically, the action space at t indicates the bandwidth allocation for each user, and it is defined as $$a_t = b^t, \tag{18}$$

where $b^t = \{b_1^t, b_2^t, \ldots, b_m^t\}$. Next, the action of offloading access is defined as $$x_i^t = \begin{cases} 1, & \text{if } b_i^t > 0, \\ 0, & \text{otherwise.} \end{cases} \tag{19}$$

If the allocated bandwidth is positive, a request for offloading access will be accepted along with the corresponding bandwidth allocation. Otherwise, the request will be rejected and the task will be executed locally.

Reward Function. The optimization objective of P1.2 is to maximize the cumulative ESP revenues from users. Therefore, the reward function indicates ESP revenues, and it is defined as $$r_t = \sum_{i=1}^{n} v_i^t \rho_i. \tag{20}$$

Based on the above definitions, we propose an improved DRL-based computation offloading access and resource allocation method. The key steps are outlined in Algorithm 3.

---

Algorithm 3: An improved DRL for computation offloading access and resource allocation

---

Input: $F_{esp}^h$, $B_{esp}^h$
Output: $b^t$, $x^t$
Initialize: the online networks $Q_1$, $Q_2$, μ
Initialize: the target networks $Q'_1 \leftarrow Q_1$, $Q'_2 \leftarrow Q_2$, μ' ← μ
for epoch = 1, 2, . . ., N do
  | Initialize $s_1$ = env.reset( );
  | for t = 1, 2, . . ., T do
    | | Explore the action of resource allocation: $a_t = \mu(s_t|\theta^\mu) + N_t$;
    | | Obtain $b^t$ and $x^t$ according to Eqs. (18) and (19);
    | | Feedback $r_t$ and $s_{t+1}$ after executing the action: $r_t$, $s_{t+1}$ = env.step($a_t$);
    | | Store samples of state transition:
    | | RB.push($s_t$, $a_t$, $r_t$, $s_{t+1}$);
    | | Randomly select K samples:
    | | K * (st, $a_t$, $r_t$, $s_{t+1}$) = RB.Sample(K);
    | | Obtain $a_{t+1}$ at $s_{t+1}$ by μ';
    | | Calculate target Q-value $y_t$ by using $r_t$ rand comparing two critic-networks;
    | | Update $Q_1$ and $Q_2$;
    | | if t mod 2 = 0 then
    | | Update μ, $Q'_1$, $Q'_2$ and μ';
    | | end
  | end
end

---

First, we initialize the online networks including two critic-networks $Q_1$ and $Q_2$ and the actor-network μ, and two target critic-networks Q1' and Q2' and the target actor-network μ'. Different from the classic DRL that uses the maximized Q-values for evaluation, the proposed method introduces two independent critic-networks to approximate the Q-value function with smaller values. This design helps alleviate the Q-value overestimation and prevents the algorithm from getting stuck in sub-optimal solutions due to excessive cumulative errors. For each training epoch, the environment is first initialized. At each short time slot t, the users send their requests of computation offloading access to the ESP. For these requests, the state $s_t$ is fed into the actor-network μ, and then the DRL agent explores the action of resource allocation $a_t$ in the current state according to p and exploration noise. Next, the actions of bandwidth allocation $b^t$ and computation offloading access $x^t$ are obtained according to Eqs. (18) and (19). After completing bandwidth allocation and computation offloading, the environment provides feedback in the form of immediate reward and the next state. Next, the samples of state transition are stored in the replay buffer, where K training samples are randomly selected for updating network parameters. When updating the critic-network, the action $\tilde{a}_{t+1}$ at $s_{t+1}$ is first obtained by the target actor-network. This process can be described as $$\tilde{a}_{t+1} = \mu'\left(s_{t+1}|\theta^{\mu'}\right) + \varepsilon, \varepsilon \sim N(0, \sigma), \tag{21}$$

where the network noise ε is a regularization that makes similar actions own comparable rewards.

Then, the target Q-value is obtained by using the reward and comparing two critic-networks. This process can be described as $$y_t = r(s_t, a_i) + \gamma \cdot \min_{i=1,2}\left(Q'_{\theta_i}(s_{t+1}, \tilde{a}_{t+1})\right). \tag{22}$$

Next, the two critic-networks are updated. To reduce the updating frequency of low-quality policies, we design a delay mechanism to update the actor-network and target networks. If t mod 2=0, the actor-network is updated using gradient ascent, and the target networks are updated using soft updates. Thus, the actor-network is updated more frequently than the critic-network. Compared to frequent network updates, this manner reduces cumulative errors and thus improves training stability.

D. Complexity Analysis

The proposed SliceOff consists of two main phases including offline training and online decision-making.

Offline Training. There are M iterations for training the LSTM in Algorithm 2, each iteration contains H long time slots, the length of the prediction window is $L_p$, and thus the complexity of training the LSTM is $O(M\ H\ L_p)$. There are N training epochs in Algorithm 3, each training epoch contains H long time slots, each long time slot contains T short time slots, and thus the training complexity is $O(NH\ T)$.

Online Decision-making. For each long time slot, the complexity of predicting traffic is $O(L_p)$, the complexity of slice partitioning is $O(T)$, the complexity of the improved DRL is $O(T)$, and thus the complexity of the online decision-making is $O(L_p+T)$.

Through the above analysis, it is noted that the SliceOff owns low complexity. Therefore, it is able to quickly adjust the policy of network slicing and computation offloading and well fit in complex MEC scenarios with different problem scales.

Performance Evaluation

In this section, we evaluate the proposed SliceOff by conducting extensive simulation and testbed experiments.

A. Experiment Setup

Experimental Environment and Datasets. Based on a workstation equipped with an 8-core Intel® Xeon® Silver 4208 CPU@3.2 GHz, 2 NVIDIA GeForce RTX 3090 GPUs, and 32 GB RAM, we build a simulation environment for the proposed system and implement the SliceOff by using PyTorch. The real-world datasets of Milan cellular traffic [9] are used to construct dynamic user requests. The datasets contain three types of services including message, call, and Internet. The user traffic over two months was recorded with a sampling frequency of 10 min. Specifically, we select 3 regions (ID=4259, 4456, and 5060) and regard the traffic of Internet service recorded each time as the number of user requests in a short time slot. Moreover, an epoch contains 24 long time slots and each long time slot contains 6 short time slots.

Parameter Settings. The communication coverage of the BS is with a radius of 3 km, which is divided into 3 regions with different distances to the BS (i.e., 0~1.5 km, 1.5~2.5 km, and 2.5~3 km), corresponding to the selected 3 regions in the datasets. Moreover, $B_{max}$=15 MHz, $F_{max}$=30 GHz, $f^{loc}$=1.0 GHz, $f^{edge}$=2.0 GHz, p=100 mW, $\beta_0$=−60 dB, $\theta$=2, and $\sigma^2$=−110 dBm. For a task, $d_i \in [200, 500]$ KB, $\eta_i \in [1, 10]$, $\rho_i \in \{1, 2, 3\}$, $T^{max}$=0.8 s, $\Phi$=1.0 \$, $\zeta_b$=0.28 \$/Mbps, $\zeta_f$=0.67 \$/GHz. For SliceOff, $\gamma$=0.001, $L_c$=12, $L_p$=6, and the learning rate is 0.001.

Performance Metrics. Except for ESP profits, we use the following metrics to further evaluate the SliceOff Resource Utilization (RU): The rate between the actually used resources of executing offloaded tasks and the resources allocated to the ESP.

Deadline Violate Rate (DVR): The rate of the number of tasks whose execution time exceeds the maximum tolerable delay and the total number of tasks.

Comparison Methods. We compare the SliceOff with the following benchmark methods to verify its superiority.

SliceDDPG: The LSTM-based bandwidth prediction is used for network slicing and the DDPG is used to handle computation offloading and resource allocation.

Off: An improved DDPG is used for computation offloading under fixed slice resources, where half of the total resources are allocated to the ESP.

MEC: Half of the total resources are allocated to the ESP that accepts all offloading requests, and the bandwidth is averagely allocated to users.

Local: All tasks are executed locally without considering the costs of MEC resources.

B. Experiment Results and Analysis

Figure 3:
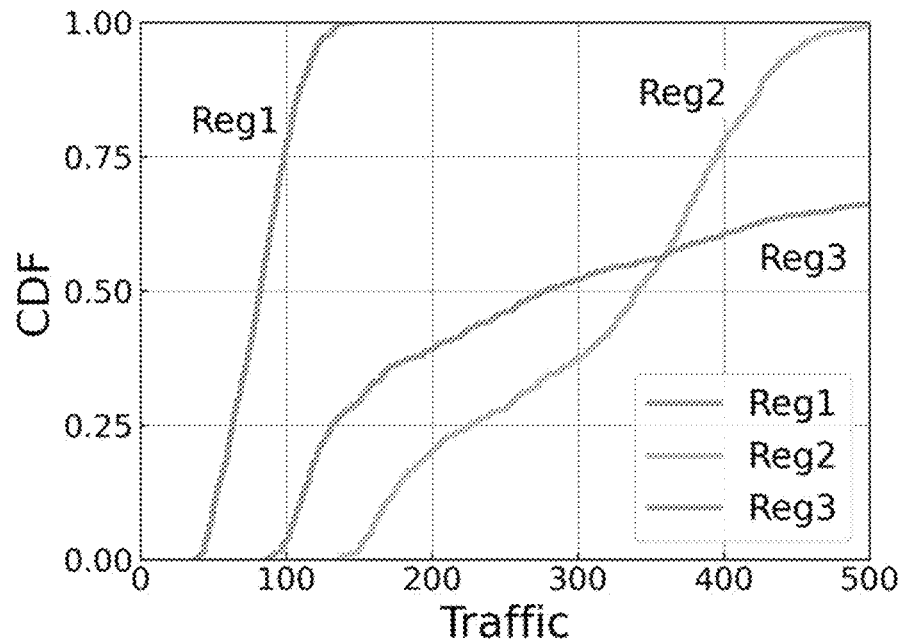
FIG. 3 shows CDF of user traffic.
Figure 4:
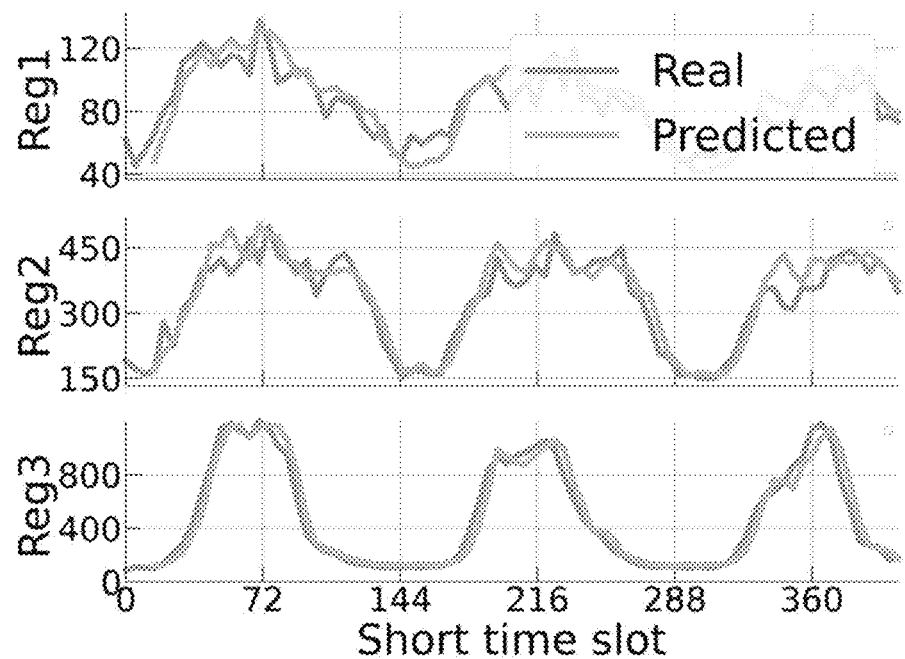
FIG. 4 shows prediction of user traffic.

Traffic Distribution and Prediction. FIG. 3 illustrates the distribution of user traffic in different regions. The three regions exhibit various cumulative probabilities of user traffic, indicating significant differences in the spatial distribution of user traffic. The comparison of the predicted values and real values in different regions is shown in FIG. 4, where the user traffic dynamically changes over time and presents a certain periodicity. This indicates the uneven temporal distribution of user traffic. The results show that the SliceOff can effectively capture the fluctuating trend of user traffic, resulting in excellent prediction performance within different short time slots for various regions.

Figure 5:
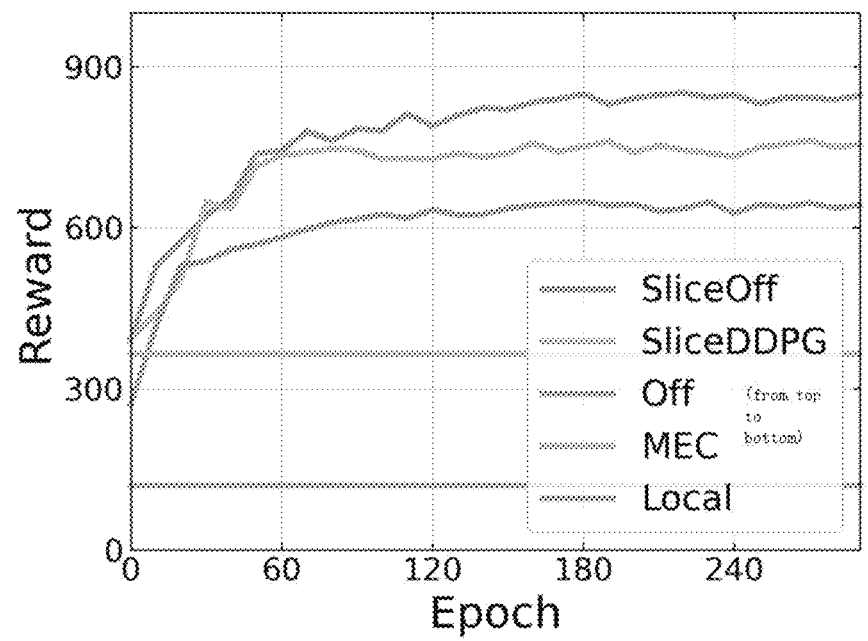
FIG. 5 shows a convergence comparison.

Convergence Analysis. FIG. 5 presents the convergence comparison of the SliceOff with other benchmark methods. The Local and MEC perform worse than the other three DRL based methods because they do not well consider changeable system states and diverse task attributes, resulting in the failure of many tasks due to exceeding the maximum tolerance delay. Compared to the Off that uses fixed slice resources, the SliceOff and SliceDDPG significantly increase ESP profits by dynamically adjusting slice resources based on the accurate prediction of user traffic. Compared to the SliceDDPG, the SliceOff demonstrates more stable convergence and higher rewards during the training process. This is because the SliceOff employs a delayed-update mechanism that avoids frequent network updates, reducing cumulative errors and thus improving training stability. Meanwhile, the SliceOff adopts two independent critic-networks, solving the problem of Q-value overestimation that exists in the SliceDDPG.

Figure 6:
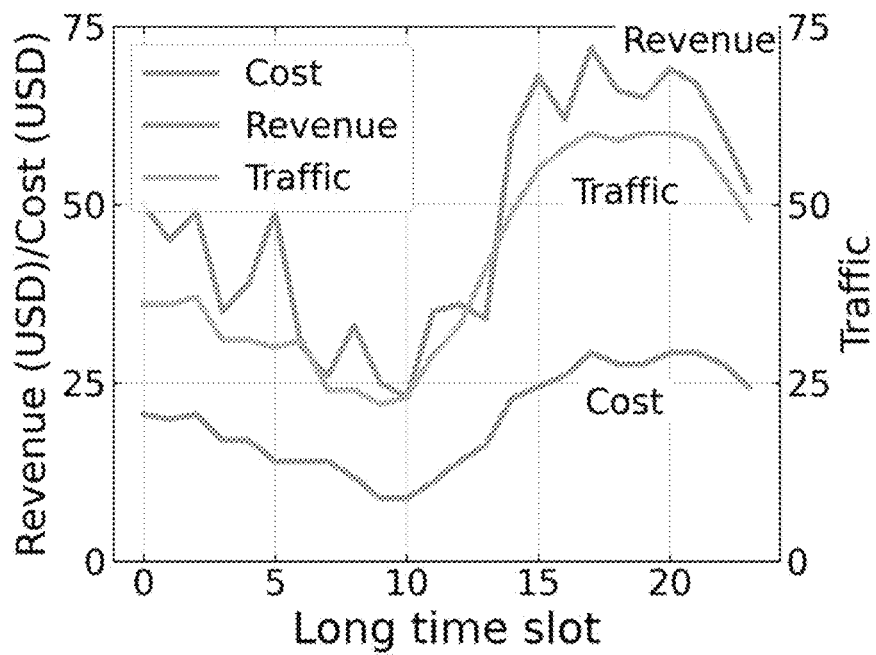
FIG. 6 shows changes of different indexes.

Revenue-cost Trend. FIG. 6 depicts the trends of revenues and costs with the change of traffic in different long time slots. The ESP revenues decline with the decrease of user traffic.

This is because the SliceOffreduces the resources allocated to the ESP to save costs and improve profits. In contrast, as the user traffic grows, the SliceOffincreases the resources allocated to the ESP, enabling more tasks to be completed, and thus increasing ESP revenue. It is worth noting that the difference between revenues and costs is considered as profits. The variation of ESP profits along with user traffic demonstrates that the SliceOff can make proper offloading decisions and maintain high profits across a variety of scenarios.

Figure 7:
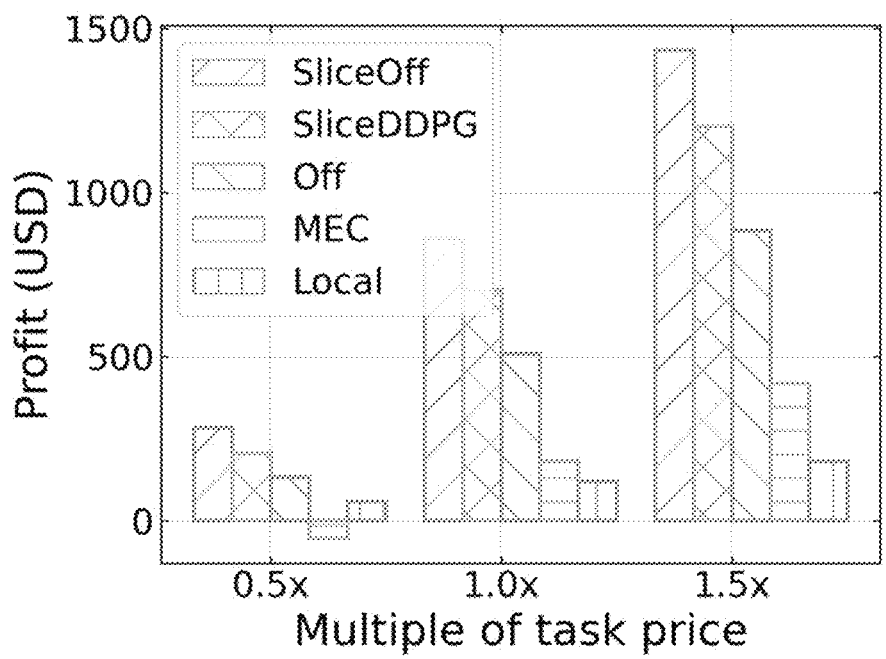
FIG. 7 shows profit with various prices.
Figure 8:
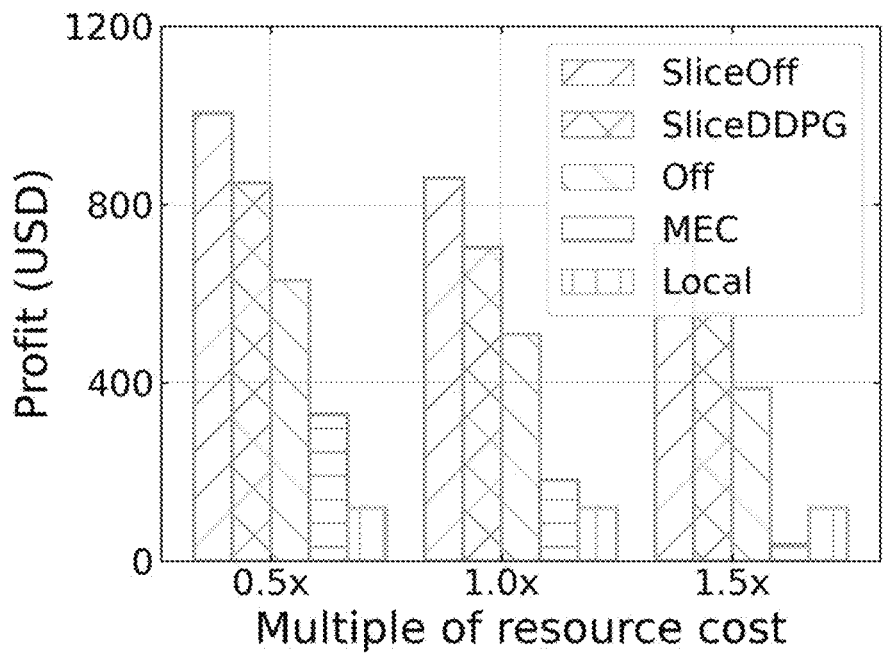
FIG. 8 shows profit with various costs.

Profit Evaluation. FIGS. 7 and 8 illustrate the impact of task price and resource cost on ESP profits achieved by different methods. As shown in FIG. 7, when the task price is low (e.g., the multiple is 0.5×), the MEC ends up with negative profits because the cost of resources outweighs the revenue generated. As the task price increases, the ESP can earn more profits. The MEC outperforms the Local because the Local can only complete a few tasks, and thus the increase of task price has less impact on the Local. Compared to other benchmark methods, the SliceOff achieves higher profits in different scenarios, which demonstrates the superiority of the SliceOffin addressing the problems of slice partitioning and computation offloading. As shown in FIG. 8, the Local does not use MEC resources, and thus any change in resource costs does not affect profits. For all methods, ESP profits decrease with the increase of resource costs. The MEC exhibits the most obvious reduction in profits as the multiple grows to 1.5×, even leading to lower profits than the Local. In different resource cost scenarios, the SliceOff always achieves the best performance, verifying the superiority of the SliceOffin enhancing ESP profits.

Figure 9:
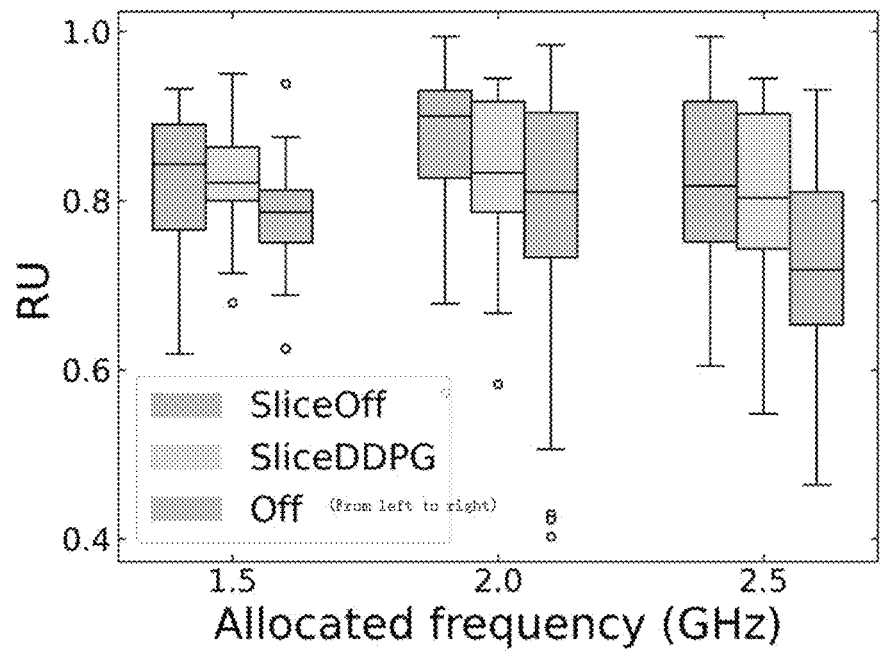
FIG. 9 shows RU with various frequencies.

RU Analysis. FIG. 9 presents the RU achieved by three DRL-based methods under various allocated edge frequencies. The RU first increases and then decreases as the allocated frequency grows. This is due to when the allocated frequency is low, the required bandwidth to complete the offloaded tasks becomes high. In such a situation, the allocated bandwidth may not be sufficient to process all offloaded tasks, resulting in some tasks being executed locally, leading to a decreasing RU. When the allocated frequency is high, the limited MEC computational capability may reduce the number of offloaded tasks that can be processed, also causing a decrease in RU. The results reveal that properly enhancing the allocated edge frequency can improve the RU. The SliceOff outperforms the SliceDDPG and Off. The reason for this is that Off adopts fixed slice resources, lacking the ability to dynamic MEC resources. The SliceOff can utilize resources better by using two critic-networks, maintaining a higher RU than the SliceDDPG.

Figure 10:
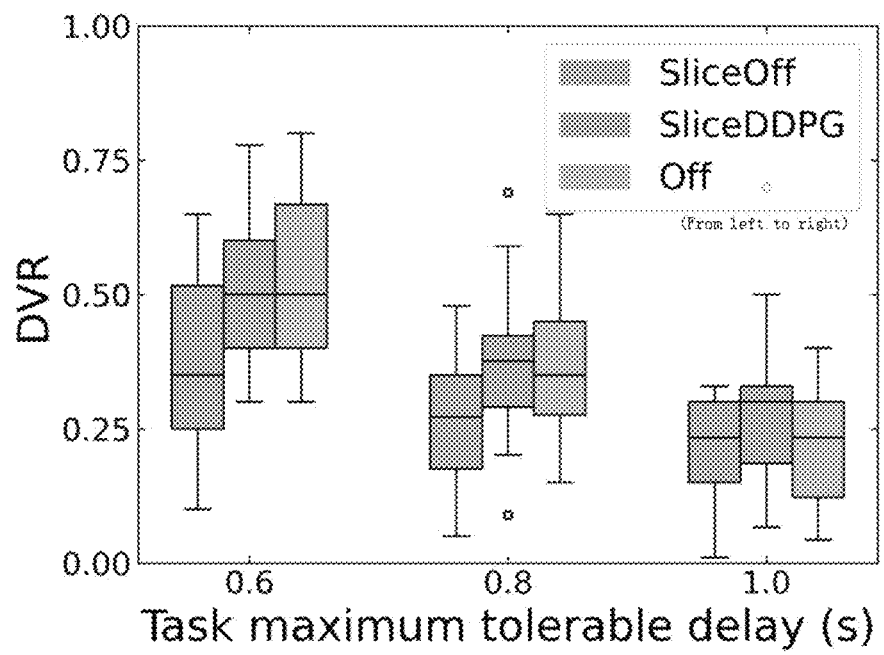
FIG. 10 shows DVR with various tolerances.

DVR Analysis. FIG. 10 depicts the DVR achieved by three DRL-based methods under various task maximum tolerable delays. The DVR decreases significantly with the increases of the task maximum tolerable delay that determines the available time to complete tasks. When the task maximum tolerable delay is high (e.g., 1.0 s), the DVR approaches 0, indicating that the available resources can well meet the demands of processing tasks. Compared to the Off and SliceDDPG, the SliceOff is able to complete more tasks within the maximum tolerable delay and achieve a lower DVR. This is because the SliceOff can adaptively make more rational decisions of computation offloading and resource allocation based on dynamic system states and changeable service demands.

C. Testbed Validation

Settup of Real-world Testbed. By using hardware devices, we build a real-world testbed to further evaluate the feasibility and practicality of the proposed SliceOff the testbed consists of three user devices (i.e., Raspberry 4B equipped with Broadcom BCM2711 SoC@1.5 GHz, 4 GB RAM, and Raspbian GNU/Linux 11 OS) and three MEC servers (i.e., Jetson TX2 equipped with quad-core Arm CortexA57 MP Core processor, 256-core NVIDIA Pascal GPU, 8 GB RAM, and Ubuntu 18.04.6 LTS OS). All the devices are connected to a 5 GHz router, where the communication platform is constructed by using the Flask framework. We regard image classification as a service instance for computation offloading, and users generate image classification tasks with different data sizes and send offloading access requests in different time slots. If the requests are accepted, the images will be uploaded to MEC servers for processing. Otherwise, the task will be processed locally. For slice partitioning, we use the number of MEC servers as the basic partitioning units. For example, if there are insufficient computing resources, all tasks will be offloaded to one MEC server for processing. Otherwise, tasks will be offloaded to different MEC servers for processing. Since the data transmission time may be affected by real world channel environments, we consider the error between the allocated bandwidth and the actual one when calculating the image transmission time. Moreover, we place user devices at different locations in our lab. At each time slot, the data size and computational demand of tasks are proportional to the user traffic used in simulation experiments.

Figure 11:
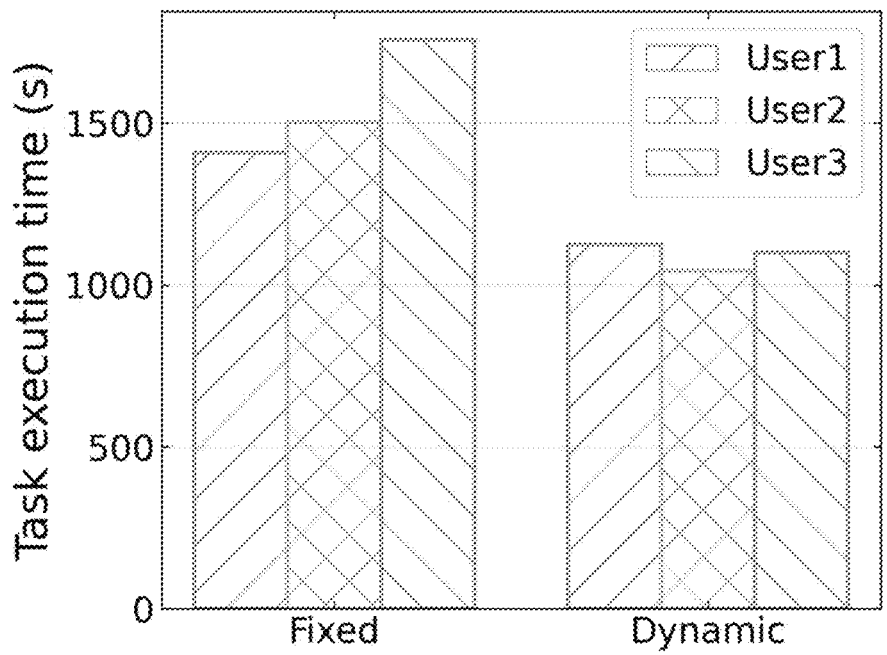
FIG. 11 shows Task execution time with different bandwidth allocation strategies.
Figure 12:
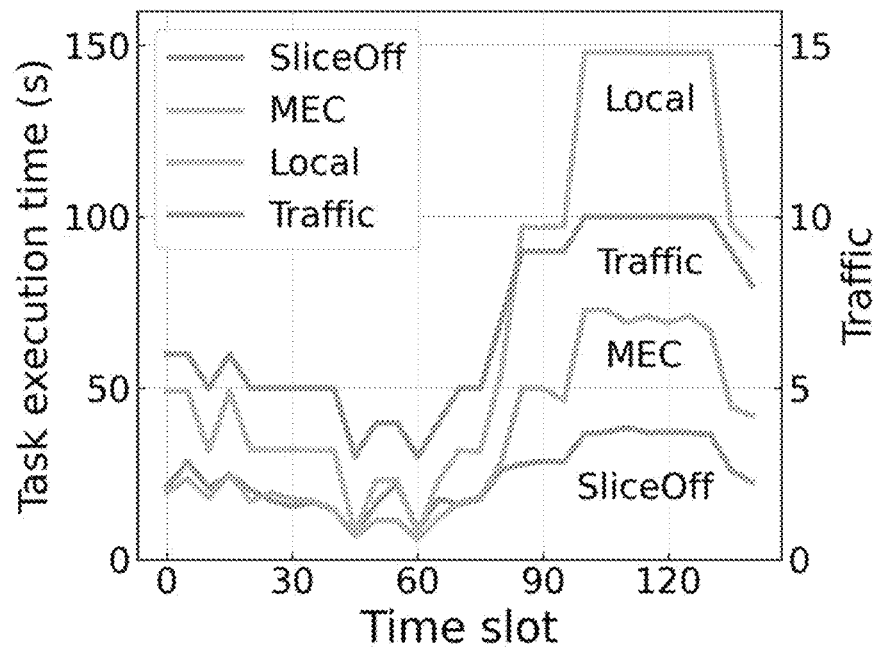
FIG. 12 shows Task execution time with different offloading methods.

Validation Results. Based on the real-world testbed, we first evaluate the task execution time by using different bandwidth allocation strategies, where all offloading requests are accepted. As shown in FIG. 11, when using fixed bandwidth allocation, the task execution time of users grows as their distance to the MEC server increases. This is because the long-distance data transmission in unstable real-world channel environments causes excessive transmission time. When using dynamic bandwidth allocation, the task execution time is comparable in different regions and lower than the fixed one. This demonstrates that the SliceOff can mitigate the performance imbalance caused by diverse user space distribution and thus reduce task execution time. Next, we conduct a comparison of the task execution time for all three users, using the SliceOff, MEC, and Local in different time slots. As shown in FIG. 12, the task execution time achieved by using the Local generally changes along with the user traffic, indicating that the variability in the temporal distribution of user traffic causes a significantly impact on Local. Compared to the Local and MEC, the SliceOff takes less time to process tasks. This is because the SliceOff considers both local and edge computing resources in a time slot, and it can adaptively adjust slice resources according to user traffic, balancing task execution time and system resource costs in different time slots.

CONCLUSION

In this paper, we propose SliceOff, a novel profit-aware offloading framework towards prediction-assisted MEC network slicing. In Sliceoff, we decouple the optimization problem of maximizing long-term ESP profits into the sub-problems of EnS and CoA. For EnS, we design a new prediction-assisted slice partitioning method to theoretically derive the optimal partitioning of network slices based on the accurate prediction of future user traffic. For CoA, we first prove that it is NPhard and then develop an improved DRL-based computation offloading and resource allocation method with twin critic-networks and delay mechanism. By using real-world testbed and datasets of user traffic, we demonstrate the effectiveness of the proposed SliceOffvia extensive experiments. Compared to benchmark methods, the SliceOff shows better performance and more stable convergence in terms of ESP profits, RU, and DVR under different scenarios. Further, real-world testbed experiments validate the feasibility and practicality of the SliceOff, which mitigates the performance imbalance caused by diverse spatio-temporal distributions of user requests and thus improves the task execution time.

The above are preferred embodiments of the present invention, and any change made in accordance with the technical solution of the present invention shall fall within the protection scope of the present invention if its function and role do not exceed the scope of the technical solution of the present invention.

What is claimed is:

1. A Profit-aware Offloading Framework system for Prediction-assisted Mobile Edge Computing (MEC) Network Slicing, comprising:

a processor; and a memory storing computer readable instructions configured to be executed by the processor and cause the processor to:

formulate an optimization problem of maximizing long-term Edge Service Provider (ESP) profits and decouple the problem into sub-problems of Edge network Slicing (EnS) and Computation offloading Access (CoA);

for the Edge network slicing sub-problem, use a gated recurrent neural network (GRNN) to accurately predict user requests in different regions, and then use an optimal partitioning of network slices with predicted requests and expected demands;

for the Computation offloading Access sub-problem, incorporate results from the optimal partitioning, use deep reinforcement learning (DRL) with twin critic-networks and delay mechanism, and solve a Q-value overestimation and high variance for approximating an optimal offloading and resource allocation;

wherein formulating the optimization problem of maximizing long-term ESP profits and decouple the problem into the sub-problems of Edge network Slicing (EnS) and Computation offloading Access (CoA) further comprises:

assessing the profits of the ESP by considering both the revenues and costs of processing tasks;

wherein the ESP receives revenues from users according to provided services;

when a user task is completed within a maximum tolerable delay $T^{max}$, the ESP receives revenue $\Phi$ otherwise, the ESP determines that there is no revenue; the revenue received from u, within t defined as $$v_i^t = \begin{cases} \Phi, & \text{if } T_i^{total} \leq T^{max} \\ 0, & \text{otherwise} \end{cases},$$

after completing tasks with different priorities, the ESP receives various revenues;

the revenues within h are defined as $$R^h = \sum_{t=1}^{T} \sum_{i=1}^{n} v_i^t \rho_i$$

the ESP is configured to pay for the rented resources;
the costs of renting resources within h are defined as $$C^h = \zeta_b B_{esp}^h + \zeta_f F_{esp}^h$$

where $B_{esp}^h$ and $F_{esp}^h$ are bandwidth and computing resources rented by the ESP, respectively; $\zeta_b$ and $\zeta_f$ are the unit price of bandwidth and computing resources, respectively;

wherein the optimization problem is defined as $$\max_{B,F,x,b} \sum_{h=1}^{H}(R^h - C^h) \quad \text{P1}$$

s.t. C1: $B_{esp}^h \in [0, B_{max}], \forall h,$

C2: $F_{esp}^h \in [0, F_{max}], \forall h,$

-continued

C3: $x_i^t \in \{0, 1\}, \forall i, \forall t,$

C4: $\sum_{i=1}^{n} b_i^t \leq B_{esp}^h, \forall t,$

C5: $\sum_{i=1}^{n} f^{edge} \leq F_{esp}^h, \forall t$ where C1 and C2 represent that the bandwidth and computing resources allocated to the ESP cannot exceed total system resources;

C3 represents that the offloading request can only be accepted or rejected by the ESP;

C4 and C5 represent that the bandwidth and computing resources allocated to users cannot exceed available resources of the ESP;

wherein the allocation of bandwidth and computing resources is a continuous decision-making process and the offloading decision is an integer variable, P1 is a mixed integer nonlinear programming (MINLP) problem, decoupled into the sub-problems of Edge network slicing (EnS) and Computation offloading Access (CoA) as follows:

P1.1 (EnS): maximize ESP profits in long time slots by partitioning network slices, defined as:

$$\max_{B,F} \sum_{h=1}^{H}(R^h - C^h)$$

s.t. $C1 - C2$

P1.2 (CoA): maximize the ESP revenues in short time slots by conducting computation offloading and resource allocation, defined as $$\max_{x,b} \sum_{i=1}^{n} v_i^t \rho_i$$

s.t. $C3 - C5.$

2. The Profit-aware Offloading Framework system for Prediction-assisted MEC Network Slicing according to claim 1, wherein using the gated recurrent neural network (GRNN) to accurately predict user requests in different regions, and then use the optimal partitioning of network slices with the predicted requests and expected demands further comprises:

adopting the historical average value (HAV) to calculate the expected resource demands based on the predicted user request traffic, wherein different regions have varying bandwidth demands; and using Long Short-Term Memory (LSTM) to predict user request traffic in these regions; and deriving the optimal slice partitioning through combining the predicted user request traffic and expected resource demands.

3. The Profit-aware Offloading Framework system for Prediction-assisted MEC Network Slicing according to claim 2, further comprising:

executing Algorithm 2: after inputting historical request traffic Z, initialize learning rate $\gamma$, input length $L_c$, and prediction length $L_p$, where $L_p \geq T$; for each prediction window, inputting the historical user traffic Z' into a LSTM cell to predict the traffic for future $L_p$ time slots; wherein the LSTM cell controls the information flow into neural networks through forget, input, and output gates;

wherein $Z^\tau$ is used to update the forget gate $f_\tau$ and the input gate $i_\tau$, where $f_\tau$ determines information that was forgotten at a previous moment and $i_\tau$ determines new information that will be stored in a current cell state; then, a cell candidate state $\tilde{C}_\tau$ is defined as $$\tilde{C}_\tau = \tanh(W_c[Z^\tau, H_{\tau-1}] + b_c)$$

updating cell state C, and the output gate $\tilde{z}^\tau$, and then updating an output of a hidden layer $H_\tau$; after analyzing all the data in historical windows, obtaining the prediction of user traffic for m regions in $L_p$ short time slots, denoted by $$\tilde{Z} = [\tilde{z}^1, \tilde{z}^2, \ldots, \tilde{z}^{L_p}],$$

where $$\tilde{z}^T = [\tilde{z}_1^T, \tilde{z}_2^T, \ldots, \tilde{z}_m^T];$$

for each historical short time slot t, the HAV is used to calculate the expected bandwidth $E[b_j]$ and user priority $E[\rho_j]$ for the completed tasks, and calculating the bandwidth demand $B_{need}^t$ by computing demand $F_{need}^t$ and expected revenue $R^t$ for the ESP based on $\tilde{z}_j^t f$, $E[b_j], E[\rho_j]$, and $f^{edge}$; and deriving the optimal $B_{esp}^h$ and $F_{esp}^h$ by Lemma 1 for used for slice partitioning; wherein Lemma 1 defines ESP profits being maximized when $B_{esp}^h = \max(B_{need}^t)$ and $F_{esp}^h = \max(F_{need}^t)$.

4. The Profit-aware Offloading Framework system for Prediction-assisted MEC Network Slicing according to claim 3, wherein for the offloading sub-problem, incorporate results from the optimal partitioning, using the deep reinforcement learning with twin critic-networks and delay mechanism, and solve the Q-value overestimation and high variance for approximating the optimal offloading and resource allocation further comprises:

a Deep Reinforcement Learning (DRL) agent optimizing policies through continuously interacting with the environment as a Markov decision process; wherein state space, action space, and reward function are defined as follows:

state space: the state space contains the available resources of the ESP and task attributes in the current time slot; convert the data size and computing density of tasks into the demands for uploading rate and computational frequency to better capture demand features; the system state at t is defined as $$s_t = \left\{ B_{esp}^h, F_{esp}^h, \frac{c^t L^t}{T^{max}}, \frac{c^t \eta^t}{T^{max}}, \rho^t \right\}$$

action space: design a probability distribution function for the discrete action space of offloading access; wherein the action space at t indicates the bandwidth allocation for each user, and it is defined as $$a_t = b^t,$$

where $b^t = \{b_1^t, b_2^t, \ldots, b_m^t\}$, Next, the action of offloading access is defined as $$x_i^t = \begin{cases} 1, & \text{if } b_i^t > 0, \\ 0, & \text{otherwise} \end{cases}$$

if the allocated bandwidth is positive, a request for offloading access is accepted along with the corresponding bandwidth allocation; otherwise, the request is rejected and the task will be executed locally;

reward function: the optimization objective of P1.2 is to maximize the cumulative ESP revenues from users; wherein the reward function indicates ESP revenues and is defined as $$r_t = \sum_{i=1}^n v_i^t \rho_i$$

based on the above definitions, executing Algorithm 3: initializing the online networks including two critic-networks $Q_1$ and $Q_2$ and the actor-network $\mu$, and two target critic-networks $Q_1'$ and $Q_2'$ and the target actor-network $\mu'$; for each training epoch, the environment is first initialized; at each short time slot t, the users send their requests of computation offloading access to the ESP; for these requests, the state $s_t$ is fed into the actor-network $\mu$, and then the DRL agent explores the action of resource allocation at in the current state according to $\mu$ and exploration noise; next, the actions of bandwidth allocation $b^t$ and computation offloading access $x^t$ are obtained according to Eqs $a_t = b^t$ and $$x_i^t = \begin{cases} 1, & \text{if } b_i^t > 0, \\ 0, & \text{otherwise} \end{cases};$$

after completing bandwidth allocation and computation offloading, the environment provides feedback in the form of immediate reward and the next state; the samples of state transition are stored in the replay buffer, where K training samples are randomly selected for updating network parameters; when updating the critic-network, the action $\tilde{a}_{t+1}$ at $s_{t+1}$ is first obtained by the target actor-network is described as $$\tilde{a}_{t+1} = \mu'(s_{t+1} \mid \theta^{\mu'}) + \varepsilon, \varepsilon \sim N(0, \sigma)$$

where the network noise $\varepsilon$ is a regularization that makes similar actions own comparable rewards;

the target Q-value is obtained by using the reward and comparing two critic-networks and is described as $$y_t = r(s_t, a_t) + \gamma \cdot \min_{i=1,2} \left( Q'_{\theta_i'}(s_{t+1}, \tilde{a}_{t+1}) \right)$$

wherein the two critic-networks are updated; a delay mechanism to update the actor-network and target networks is performed to reduce the updating frequency of low-quality policies; if t mod 2=0, the actor-network is updated using gradient ascent, and the target networks are updated using soft updates.

5. The Profit-aware Offloading Framework system for Prediction-assisted MEC Network Slicing according to claim 4, further comprising:

invoking Algorithm 2 for each time slot to predict the demands of bandwidth and computing resources for task execution, and then performing network slicing and calculating resource costs based on the partitioned slice resources; for each short time slot, after users send requests of computation offloading access to the ESP, invoking Algorithm 3 to generate offloading access and bandwidth allocation decisions based on the current system state and user demands; processing users' tasks according to offloading decisions and the ESP receives revenues; calculating ESP profits based on the costs and revenues; and continuing processing the next long time slot.

\* \* \* \* \*